(12) United States Patent
Tian

(10) Patent No.: US 11,891,192 B2
(45) Date of Patent: Feb. 6, 2024

(54) LANDING PLATFORM FOR UNMANNED AERIAL VEHICLE

(71) Applicant: Shanghai Autoflight Co. LTD., Shanghai (CN)

(72) Inventor: Yu Tian, Hong Kong (CN)

(73) Assignee: SHANGHAI AUTOFLIGHT CO., LTD., Shanghai (CN)

( * ) Notice: Subject to any disclaimer, the term of this patent is extended or adjusted under 35 U.S.C. 154(b) by 457 days.

(21) Appl. No.: 17/262,229

(22) PCT Filed: Jul. 23, 2018

(86) PCT No.: PCT/CN2018/096617
§ 371 (c)(1),
(2) Date: Jan. 22, 2021

(87) PCT Pub. No.: WO2020/019109
PCT Pub. Date: Jan. 30, 2020

(65) Prior Publication Data
US 2021/0300591 A1      Sep. 30, 2021

(51) Int. Cl.
| | | |
|---|---|---|
| *B64F 1/00* | (2006.01) | |
| *B64C 39/02* | (2023.01) | |
| *B64F 1/20* | (2006.01) | |
| *B64F 1/22* | (2006.01) | |
| *B64U 70/60* | (2023.01) | |
| *B64U 80/60* | (2023.01) | |
| *B64U 80/70* | (2023.01) | |
| *B64U 80/82* | (2023.01) | |
| *B64U 80/84* | (2023.01) | |
| *B64U 80/86* | (2023.01) | |

(52) U.S. Cl.
CPC ............ *B64F 1/007* (2013.01); *B64C 39/024* (2013.01); *B64F 1/20* (2013.01); *B64F 1/222* (2013.01); *B64U 70/60* (2023.01); *B64U 80/60* (2023.01); *B64U 80/70* (2023.01); *B64U 80/82* (2023.01); *B64U 80/84* (2023.01); *B64U 80/86* (2023.01)

(58) Field of Classification Search
CPC .... B64F 1/007; B64F 1/18; B64F 1/20; B64F 1/222; B64U 80/84; B64U 80/86; B64U 80/70
See application file for complete search history.

(56) References Cited

U.S. PATENT DOCUMENTS

| | | | |
|---|---|---|---|
| 10,395,544 B1 * | 8/2019 | Harris | ................... G08G 5/0069 |
| 2013/0099054 A1 * | 4/2013 | Besenzoni | .............. B63B 17/00 |
| | | | 244/110 E |

(Continued)

OTHER PUBLICATIONS

PCT/RO/105 of PCT/CN2018/096617.
PCT/RO/202 of PCT/CN2018/096617.
PCT/IB/306 of PCT/CN2018/096617.

*Primary Examiner* — Richard G Davis
(74) *Attorney, Agent, or Firm* — WPAT LAW, P.C.; Anthony King

(57) ABSTRACT

A UAV landing platform having movable covers to securely store/maintain/charge a UAV. The UAV may be launched from the landing platform, and the landing platform can have visual indicators to guide the landing of the UAV back onto the landing platform. There can be an optional mechanism to self-adjust/self-level the landing surface such that a UAV can safely land onto the landing platform even when the landing platform is on a traveling vehicle.

17 Claims, 15 Drawing Sheets

(56) References Cited

U.S. PATENT DOCUMENTS

| | | | |
|---|---|---|---|
| 2014/0070052 A1* | 3/2014 | Kang | B64F 1/007 244/114 R |
| 2015/0266575 A1* | 9/2015 | Borko | B64F 1/222 244/17.23 |
| 2017/0225800 A1* | 8/2017 | Holt | G08G 5/0021 |
| 2018/0148170 A1* | 5/2018 | Stamatovski | B64F 1/18 |

* cited by examiner

LANDING PLATFORM FOR UNMANNED AERIAL VEHICLE

CROSS-REFERENCE TO RELATED APPLICATIONS

This application claims priority to, and is a 371 national stage application of, PCT/CN2018/096617, having an international filing date of Jul. 23, 2018, now pending.

FIELD OF THE DISCLOSURE

The field of the disclosure is aerial vehicle maintenance devices in general and unmanned aerial vehicle landing platform and storage facility specifically.

BACKGROUND OF THE DISCLOSURE

Unmanned aerial vehicles (UAVs), also known as drones, are highly mobile and can be launched from anywhere by a user without the need for a specifically designated launching pad.

UAVs, however, are extremely delicate. When a UAV lands it risks crashing into the ground and break its propellers. Therefore, there remains a need to minimize UAV crashing during landing.

There are known net-recovery of fixed-wings drones. Using any type of net-recovery also risks damaging delicate parts of a UAV.

Retrieving a flying UAV onto a moving object, during extreme weather conditions or at night can also be difficult. There is a continuing need for a better method for a UAV to autonomously land itself onto a moving object, at night or during extreme weather conditions.

UAVs, especially vertical takeoff and landing (VTOL) multicopter drones, have relative short flight time and require electrical charging before it can fly again. Charging of a UAV typically requires the user to manually connect the UAV to a power source. Such labor intensive tasks are undesirable.

There is a continuing need for new ways to launch, to land, to charge, to transport, and to store a UAV.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

BRIEF SUMMARY OF THE DISCLOSURE

A landing platform for an unmanned aerial vehicle (UAV) is contemplated. In one aspect of the disclosure, the contemplated landing platform fulfills the purpose of launching a UAV from any desired location, whether from a stationary object or a mobile object in motion. In another aspect of the disclosure, the contemplated landing platform fulfills the purpose of receiving/landing a UAV at any desired location, whether the landing platform is installed on a stationary object or a mobile object in motion. In yet another aspect of the disclosure, the contemplated landing platform fulfills the purpose of storing and transporting a UAV, whether the platform is installed on a stationary object or a mobile object.

In one embodiment of the contemplated landing platform, the landing platform can have a base with a landing surface, a movable cover coupled to the base to enclose an interior space of the landing platform, and a plurality of charging contacts located on the landing surface to make direct contact with a charging contact of a UAV when the UAV rests on the landing surface. The movable cover as contemplated in some embodiments may include a plurality of pivoting panels.

In yet another contemplated embodiment, the landing platform may have accessories which allow a UAV to easily identify the location and orientation of the landing platform. In one aspect of the embodiment, the platform can have at least three visual indicators coupled to the base, each of these at least three visual indicators can have an attribute that is different from one another. For example, the three visual indicators can each have a different color. In another example, the three visual indicators can each give off a light of different color. In yet another example, the three visual indicators can each have a distinctive shape.

One further aspect of embodiments includes an optional charging capability which allows the landing platform to charge a UAV being placed on the landing surface. In one embodiment, there can be a plurality of charging contacts on the landing surface. These charging contacts can be in the form of an array of charging plates, wherein the charging plates are arranged in alternating polarities.

Another aspect of the embodiment is directed to a landing platform capable of adjusting its own orientation and/or self-leveling, especially when the landing platform is installed onto an object that does not remain immobilized. For example, a landing platform installed on a boat in the raging ocean would benefit from the contemplated features to self-level. In other words, some embodiments may have a movement compensating mechanism coupled to the base to compensate a movement of the landing surface relative to earth.

Further contemplated is for the landing platform to have a movement compensation mechanism with at least 3 axes of movement. The contemplated movement compensation mechanism can have a movable arm, joints, driving motors, and servo motors. In one embodiment, the movement compensation mechanism is attached to the landing surface and it moves the landing surface relative to the base of the platform. In another embodiment, the movement compensation mechanism is attached to the base of the landing platform and it moves the entire landing platform relative to whatever object the landing platform is installed on.

Other optionally accessories can be made available to some embodiments of the landing platform. For example, there can be a dryer or a heater coupled to the base to supply heat or airflow into the interior space to dry a resting UAV. In yet another aspect of the embodiments, the landing platform can have a wireless transmitter to automatically transfer a data to and/or from the resting UAV.

Another key aspect of the contemplated embodiments is directed to a method of storing, deploying, and maintaining an unmanned aerial vehicle (UAV). The contemplated method may include placing a UAV within the interior storage space on top of a landing surface of a mobile storage unit, where the mobile storage unit can have pivoting panels that open and close. When the pivoting panels close, the UAV can be securing contained and separated from the environments (rain, wind, snow, extreme temperatures, insects, animals, vandalism, theft, etc.)

Also contemplated is a novel method of charging a resting UAV by having a plurality of charging contacts on the landing surface so that when a UAV rests upon the landing surface, certain parts of the UAV make physical contacts and electrical contact with the charging contacts to charge the UAV. As discussed above, these charging contacts can be an array of charging plates of alternating charges. In another aspect, the UAV can have a landing gear, such as a pair of skids having electrical charging contacts on the bottom of the skids. These electrical charging contacts would effectively connect with the array of charging plates on the landing surface to effectuate electrical charging.

In yet another aspect of the embodiments, the landing platform may wirelessly charge the UAV using known wireless charging technology.

Further contemplated is the novel method of detachably couple the landing platform onto any movable object such as a land vehicle, a water craft, an aerial vehicle, a floating station, and a gear attached to an animal or man. This novel method essentially provides a mobile base station for a UAV to be launched from, return to, and performed maintenance in.

One aspect of the novel method can include compensating a relative movement of the landing platform due to the environment. For example, the landing platform may be installed on a blimp and the blimp is floating in midair experiencing air turbulence. Air turbulence would make UAV landing extremely difficult because the landing platform would move along with the blimp during air turbulence. In one aspect of the embodiments, the novel method includes using necessary mechanical arms or support to self-adjust and/or self-level the landing surface such that the landing surface remains stationary and/or level relative to earth regardless of a movement of the blimp.

In one further aspect of the embodiments, the movement compensating mechanism can include an inertial measurement unit (IMU) and a robotic arm.

One aspect of the novel method can include using a heater in the landing platform to dry a resting UAV. This can be especially useful when the outside weather is raining or snowing, and the UAV needs to be re-launched after it is properly charged and dried.

As discussed earlier, there are specifically contemplated novel methods to allow a UAV to recognize the orientation and location of the landing platform. In one aspect, the method include providing at least three visual indicators each having an attribute that is different from all others. The UAV in the air would automatically scan and search for these pre-determined attributes when the UAV is in need of landing/maintenance.

The novel method can alternative or optionally include a method of automatically and wirelessly download a data from the UAV. The UAV may be on a mission to repeatedly go out into the environment to collect data (e.g., video data), and return to the landing platform for charging. When the UAV returns to the landing platform, a wireless transmission of data can be initiated either by the UAV, the landing platform, or both. In this way, UAV may not need to use up resources in transmitting data via long distance wideband or narrowband antenna. UAV may simply collect data, return to the landing platform, unload data to the landing platform, charge electricity, and repeat mission again. In one contemplated novel method, there can be a group of landing platforms each launching a UAV in rotating shifts to perform a mission. In this way, there would always be a working UAV in the air while other UAVs are unloading data and being charged.

Various objects, features, aspects and advantages of the presently disclosed embodiments will become more apparent from the following detailed description, along with the accompanying drawings in which like numerals may represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
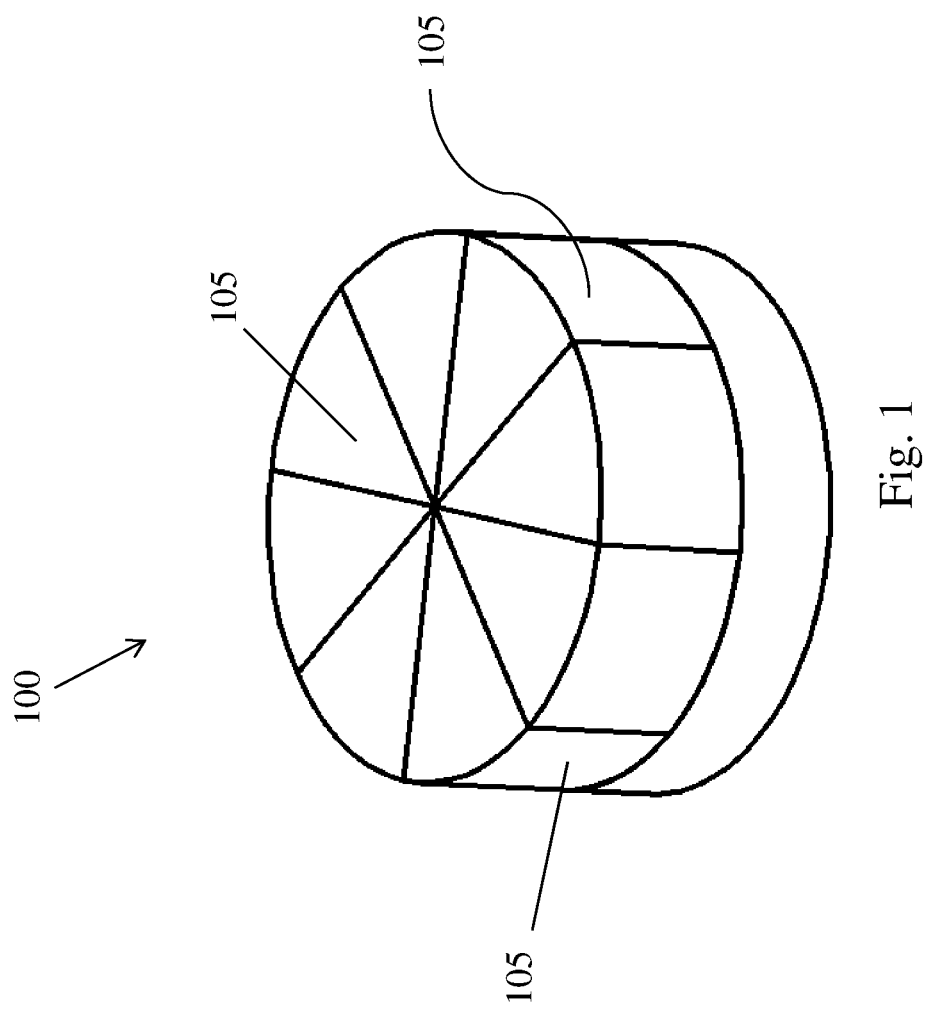
FIG. 1 is a perspective view of an embodiment of the landing platform where its pivoting panels are closed, enclosing a UAV inside, according to an aspect of the embodiment.

The following call out list of elements in the drawing can be a useful guide when referencing the elements of the drawing figures:

100 Landing platform
101 UAV
103 Skid
104 contacts
105 Pivoting panel
106 Landing surface
107 Positive charging plate
108 Negative charging plate
111 First visual indicator
112 Second visual indicator
113 Third visual indicator
114 Fourth visual indicator
115 Fifth visual indicator
120 Watercraft
121 Land vehicle
122 Floating station
123 Aircraft
130 Dryer
131 Power storage
132 wireless transmitter
133 Processor
140 Movable arm
141 First joint
142 Second joint
143 Third joint
150 IMU

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

As used herein, the term "drone" refers to an unmanned aerial vehicle, or UAV. A drone can be a fixed-wing UAV or a multicopter vertical takeoff and landing (VTOL) UAV.

As used herein, the term "watercraft" refers to any vehicle capable of traveling on or under water whether or not the vehicle is motorized. For example, a watercraft can be a power boat, a sail boat, a canoe, a surfboard, and a submarine.

As used herein, the term "land vehicle" refers to any vehicle capable of traveling on land whether or not the vehicle is motorized. For example, a land vehicle can be a car, a truck, a van, a bicycle, a motorcycle, a military tank, a passenger bus, a train, a push cart, and a land-traversing robot.

As used herein, the term "floating station" refers to any floatation device capable of floating on water whether or not the floatation device is motorized. It is also not limited by size. For example, a floating station can be a buoy no bigger than a basketball, and a floating station can be large enough to station personnel.

As used herein, the term "aircraft" refers to any vehicle capable of air travel above ground whether or not the vehicle is motorized. For example, an aircraft can be a helicopter, an airplane, a glider, and a blimp.

The inventor has discovered that a novel device that may perform at least one of the following functions: launch a UAV, receive a UAV, charge a UAV, dry a UAV, transport a UAV, download data from a UAV, upload date to a UAV, protect the UAV from the environment.

FIG. 1 generally depicts the basic structure of a landing platform 100 in accordance with one aspect of the disclosure. Here, landing platform 100 resembles the shape of a cake box. It should be appreciated that various other exterior shapes are also contemplated. For example, the landing platform 100 may adapt an aerodynamic shape. In another example, the landing platform 100 may adapt an exterior shape that conforms to the general contour of the object it is installed on.

Landing platform 100 can have a movable cover. In the embodiment shown in FIG. 1, a plurality of pivoting panels 105 are joined together in a closed configuration thereby keeping the interior of the landing platform 100 protected from the environment. These pivoting panels 105 can be actuated by any actuators such as servo motors.

Figure 2:
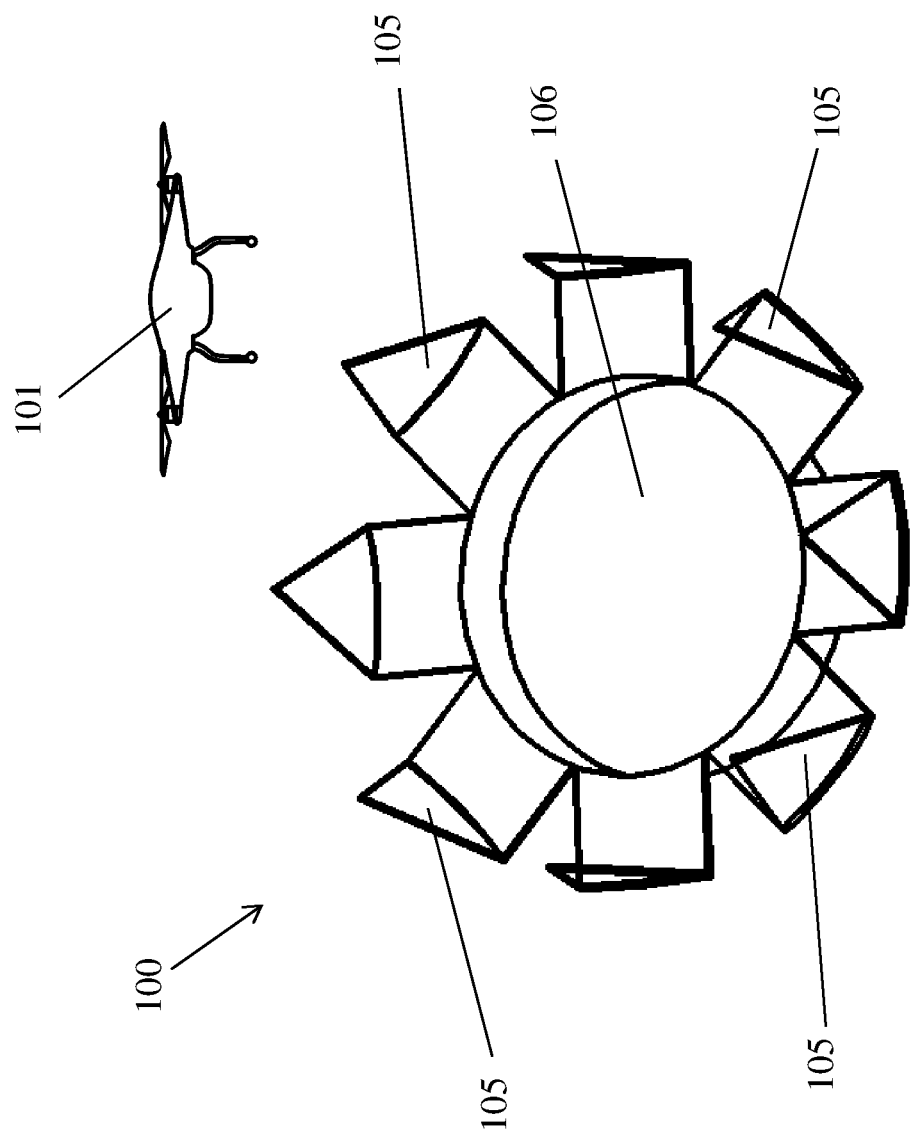
FIG. 2 is a perspective view of an embodiment of the landing platform where its pivoting panels are open, ready to receive a hovering UAV above, according to an aspect of the embodiment.

As shown further in FIG. 2, an exemplary landing platform 100 is shown with its pivoting panels 105 in an open configuration ready to receive a hovering UAV 101. A landing surface 106 can be exposed to the environment when the pivoting panels 105 are open. The hovering UAV 101 can land directly onto the landing surface 106.

It should be particularly noted that although these panels 105 are shown as pivoting panels, other movable cover types are also specifically contemplated. For example, a camera shutter-like receding panels may be implemented.

In some contemplated embodiments of removable covers, the removable covers can securely contain the resting UAV 101 within an interior space of the landing platform 100 and separate the UAV 101 from the outside environments. In some applications, the UAV 101 can be on a long-term mission at a particular locale where the UAV 101 is likely to be damaged by the environment unless protected. For example, the landing platform 100 and the UAV 101 may be installed on top of a giant *sequoia* tree and the UAV 101 is to collect data in the forest over a period of months with minimum human maintenance. The landing platform 100 and its movable cover can protect a resting UAV from rain, wind, snow, extreme temperatures, direct sunlight, insects, animals, vandalism, and theft.

The contemplated movable cover 105 can be made of suitable materials to withstand temperature extreme and blunt forces, such materials include natural and synthetic polymers, various metals and metal alloys, naturally occurring materials, textile fibers, glass and ceramic materials, and all reasonable combinations thereof.

One aspect of the landing platform 100 is that it can be a mobile unit or a stationary unit. In some embodiments, the landing platform 100 can be operational on its own without the need to be installed onto a mobile or stationary objection. In one aspect, the landing platform 100 can be set up on the ground or in the field. In another aspect, the landing platform 100 can be highly mobile and be carried by a user on foot, or using a transportation device.

Figure 7:
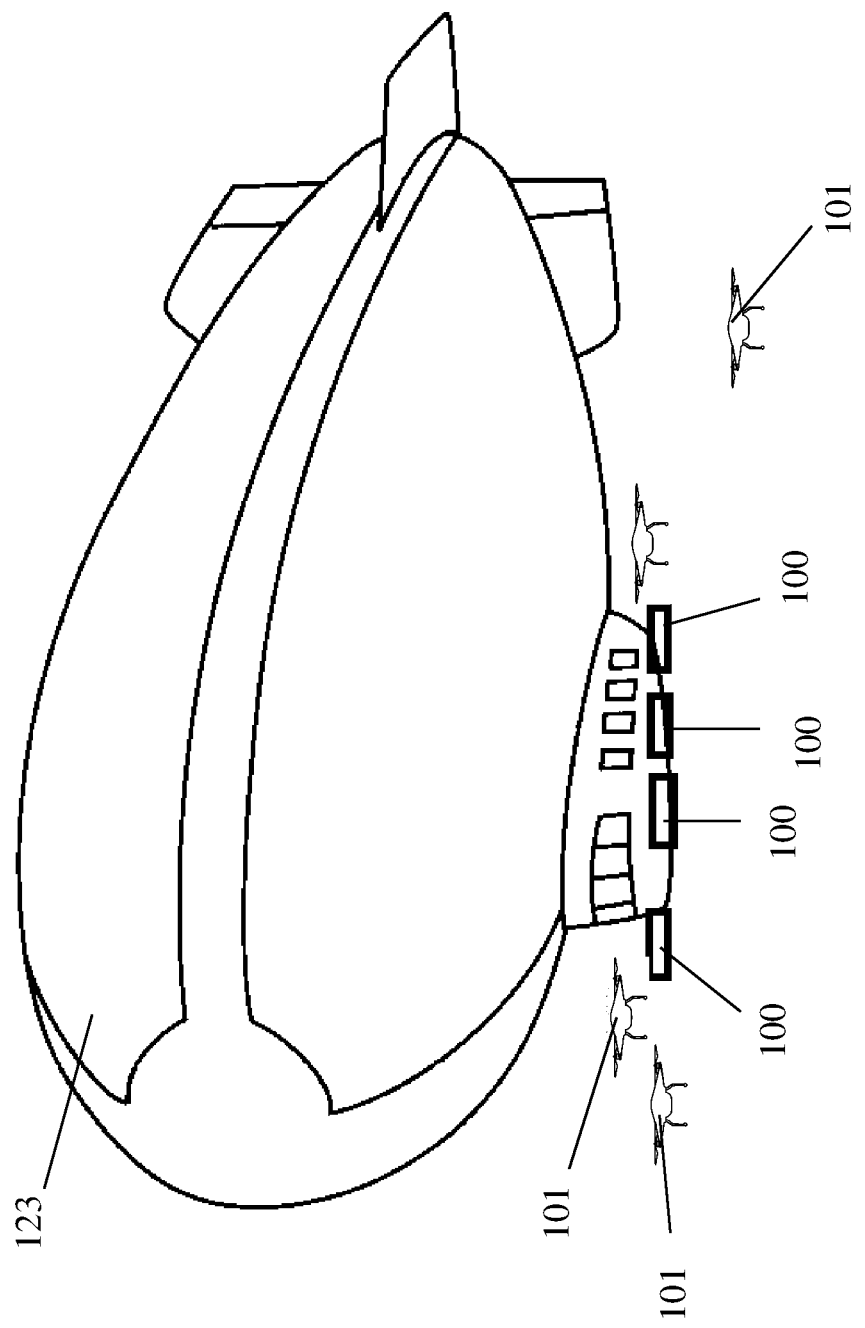
FIG. 7 is a perspective view of a blimp having multiple landing platforms installed thereon, ready to launch and receive UAVs, according to an aspect of the embodiment.

Further, the contemplated landing platform 100 can be installed onto various stationary or mobile objects. The landing platform 100 may be installed onto a building, a tripod, a watch tower, an electrical pole, a tree, a land vehicle (FIG. 4), a watercraft (FIG. 3), a floating station (FIG. 5), or an aircraft (FIG. 7).

Figure 6:
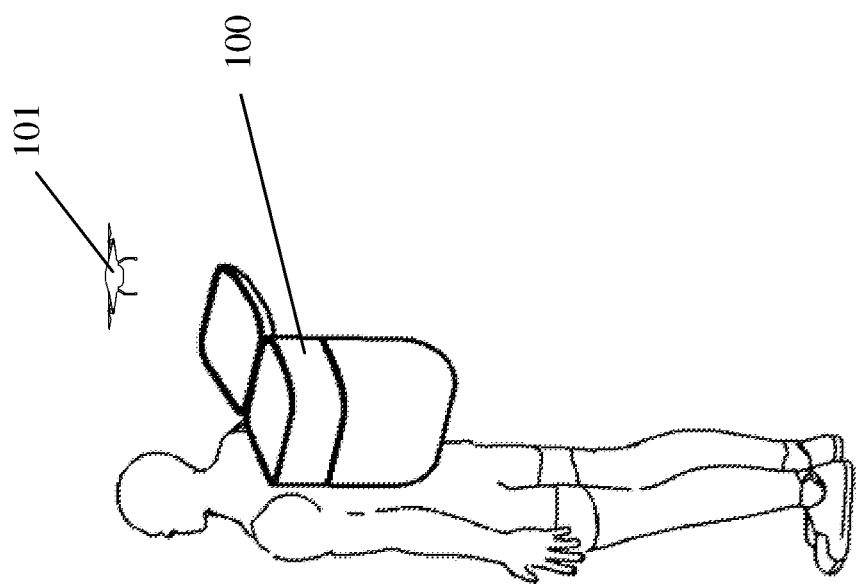
FIG. 6 is a perspective view of a hiker having one embodiment of the landing platform installed on his backpack, according to an aspect of the embodiment.

Still yet other contemplated alternative embodiments may include temporary fastening of the landing platform on an animal or a human (FIG. 6). For example, it is contemplated that a hiker may carry a backpack having an appropriately sized landing platform to deploy and manage one or more UAVs. In this situation, a plurality of miniaturized UAVs can be deployed, maintained, kept charged, by a single landing platform 100 carried on the back of the moving hiker.

Similarly, other contemplated alternative embodiments may include temporary fastening of the landing platform on a horse, a camel, a rescue dog, or an elephant.

Figure 3:
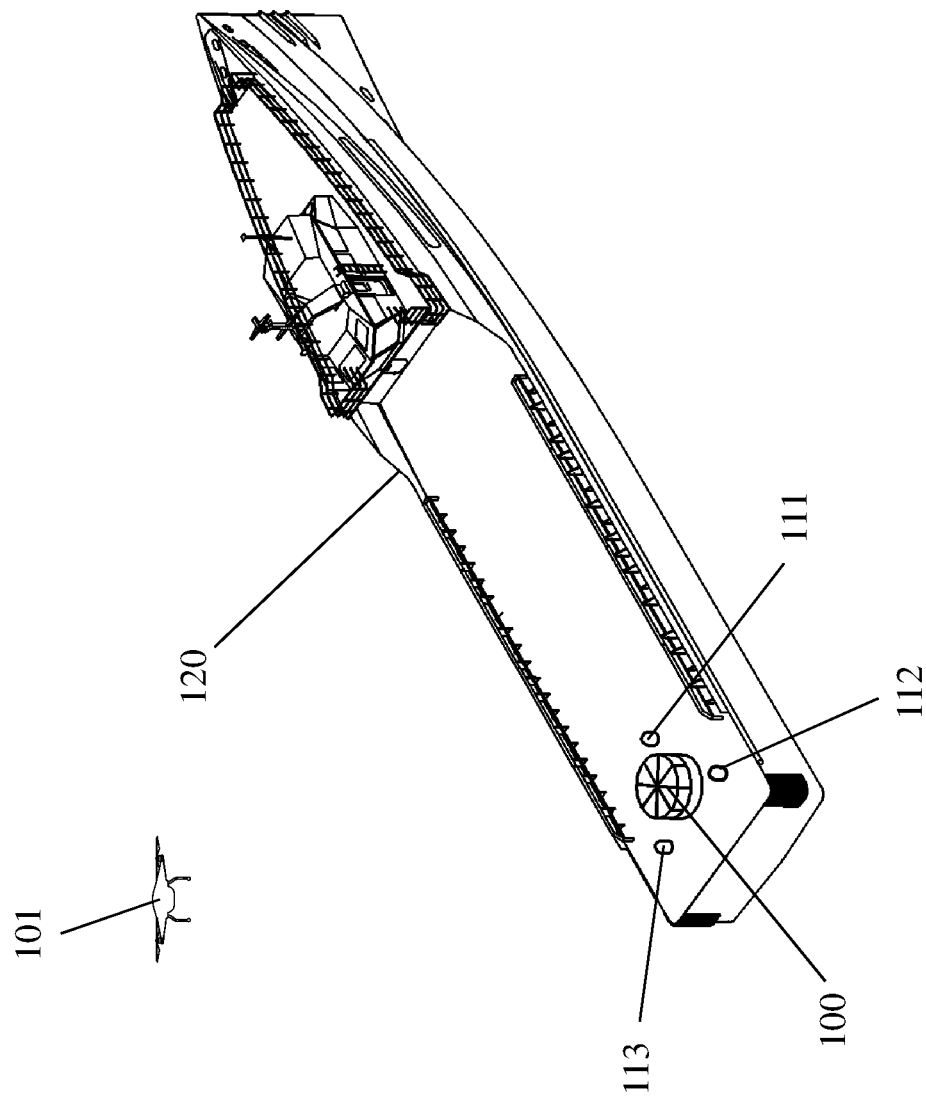
FIG. 3 is a top view of a boat having one embodiment of the landing platform with three visual indicators located near the stern of the boat, according to an aspect of the embodiment.

As shown further in FIG. 3, a landing platform 100 can be placed near the stern of a watercraft 120. Alternative, the landing platform 100 can be placed anywhere on the watercraft 120. There can be at least three visual indicators 111, 112, 113 disposed around the landing platform 100 or the landing surface 106. As will be discussed in more details later, there visual indicators 111,112, 113 are one contemplated novel method of assisting a UAV in finding the landing surface 106, especially when the landing surface 106 is in motion.

Figure 4:
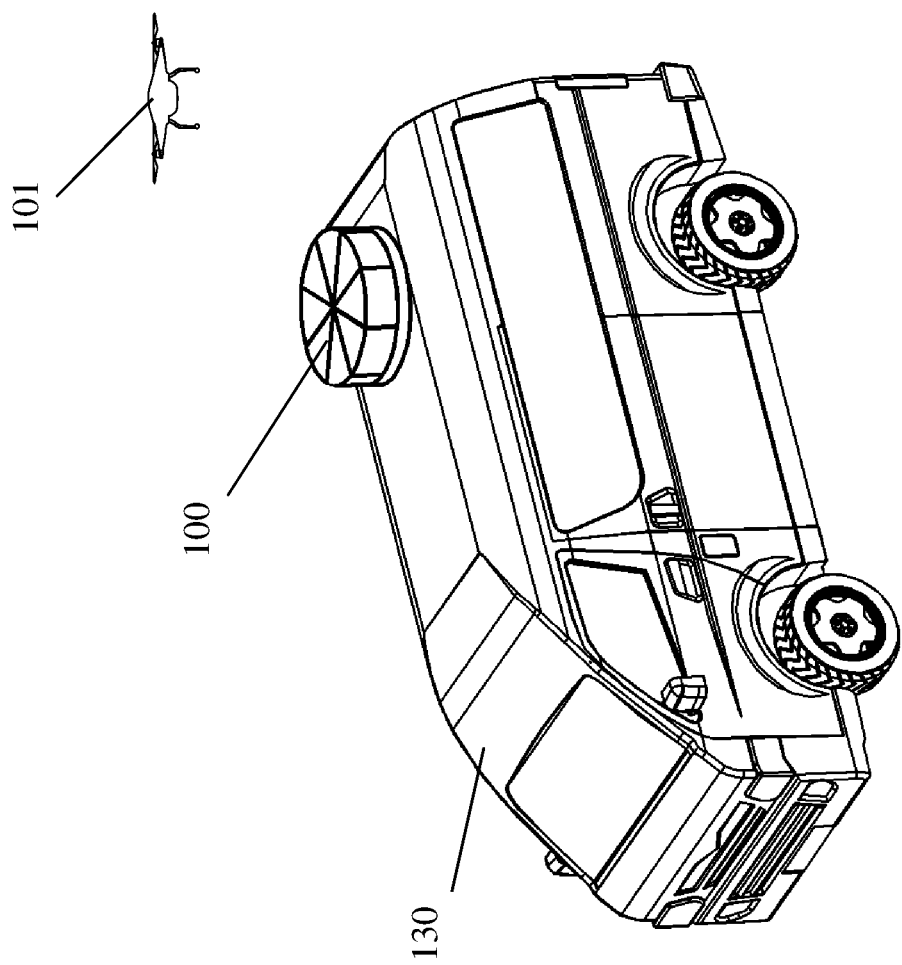
FIG. 4 is a side view of a van having one embodiment of the landing platform installed on its roof, according to an aspect of the embodiment.

Alternatively, in FIG. 4, a landing platform 100 can be positioned anywhere on a land vehicle 130. In the example shown in FIG. 4, the landing platform 100 is installed on the rear side of the van's roof. Various other locations are contemplated such other part of the roof, the hood, even the undercarriage of the van.

It is important to appreciate that the landing platform 100 can be versatile, mobile, and removable. The landing platform 100 can also be modular, where a group of landing platforms 100 may connect together to form a bee-hive of UAV deployment and maintenance center. Each UAV can be programmed to identify its own designated landing platform 100.

Figure 5:
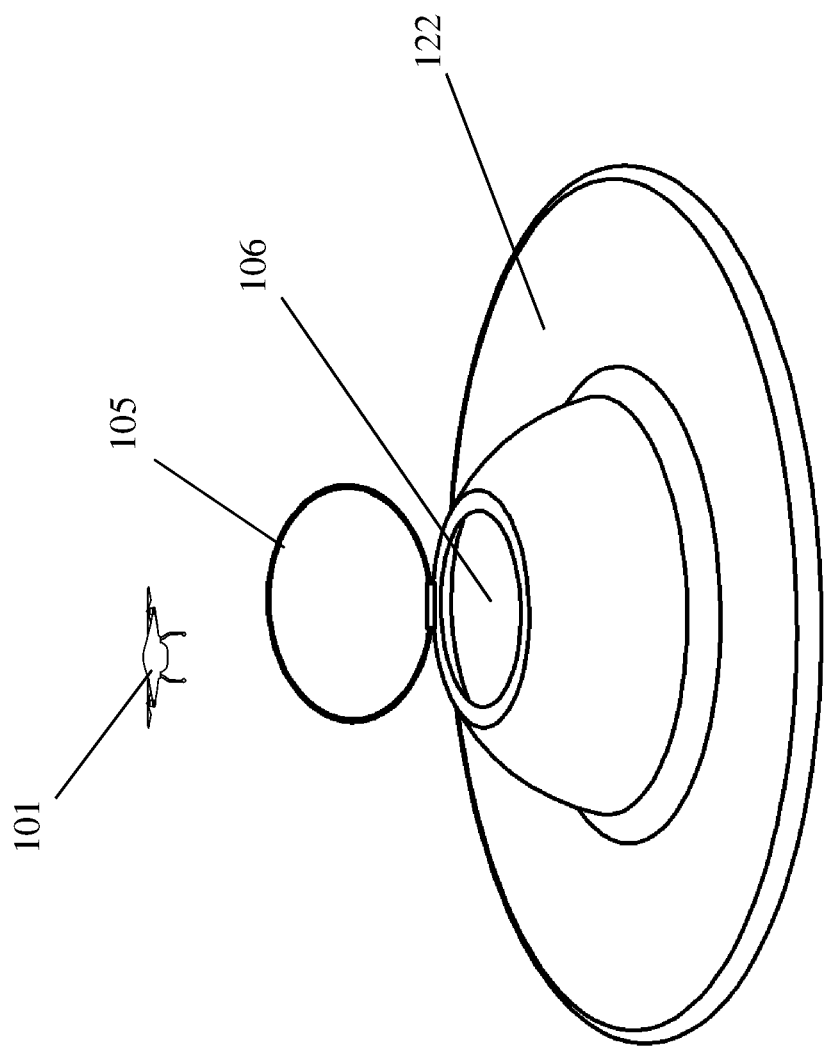
FIG. 5 is a perspective view of an embodiment of the landing platform on a floating station, ready to receive a hovering UAV above, according to an aspect of the embodiment.

FIG. 5 illustrates an embodiment where the landing platform 100 is disposed on a floating station 122 over water. The landing platform 100 can have a plurality of pivoting panels 105 as shown in FIGS. 1 and 2, or it can have one single pivoting door 105 as shown in FIG. 5.

Although the present embodiments are particularly well suited for use with land vehicles, watercraft, and floating stations, as discussed above, one aspect of one contemplated embodiment also features a mobile landing platform 100 to be carried by an animal or a human. In FIG. 6, a hiker can have a backpack with a landing platform 100 located on the top of the backpack. The UAV 101 and the landing platform 100 may be appropriately sized such that carrying a landing platform 100 is feasible for the hiker. The UAV 101 may perform various tasks for the hiker such as surveying, photo/video shooting, taking selfie photos/videos, patrolling surrounding area for wildlife/danger. As is true with all other embodiments discussed, although the single landing platform 100 may be sufficiently large for one UAV 101 to land on, there can be multiple UAVs in the air each taking turn landing on the same single landing platform 100 or multiple landing platforms 100 to recharge itself.

Still further contemplated alternative uses of the landing platform include having one or more landing platforms 100 installed on an aircraft 123. In FIG. 7, a blimp 123 can have multiple landing platforms 100 installed such that the blimp 123 acts as a mothership for multiple UAVs 101.

Figure 8:
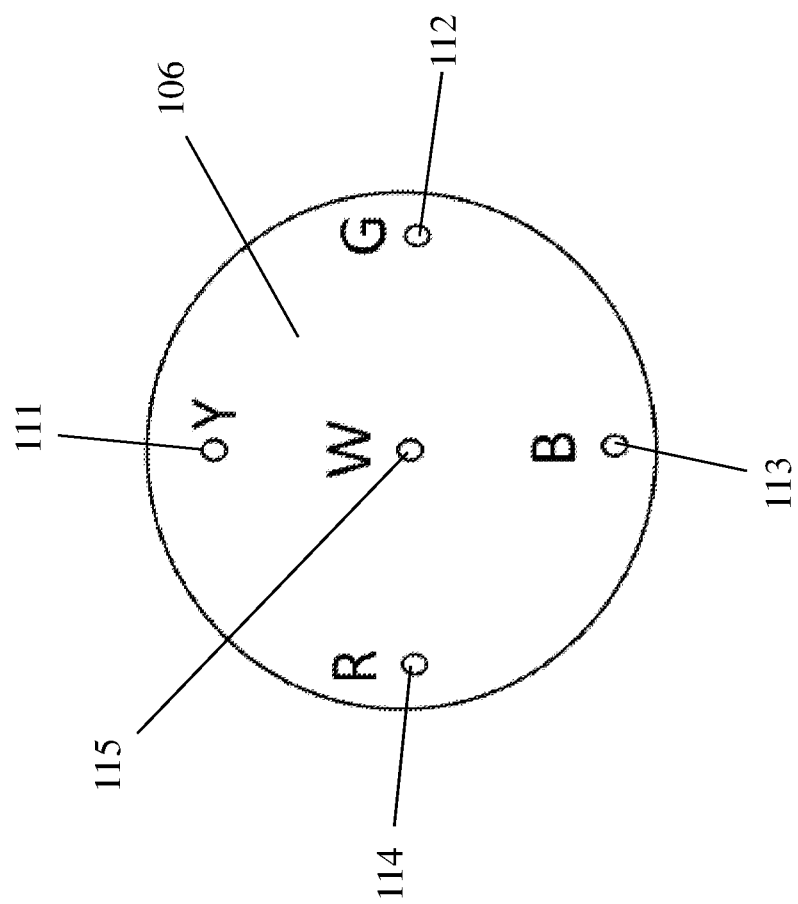
FIG. 8 illustrates a landing surface with five visual indicators, according to an aspect of the embodiment.

Referring now to FIG. 8, a contemplated landing surface 106 is shown to have five visual indicators 111, 112, 113, 114, 115. In this embodiment, each visual indicator gives off a light having a color that is different from any other visual indicators. For example, The first visual indicator 111 can give off a yellow color light; the second visual indicator 112 can give off a green color light; the third visual indicator 113 can give off a blue color light; the fourth visual indicator 114 can give off a red color light; the fifth visual indicator 115 can give off a white color light. The UAV 101 to be landed onto this particular landing surface 106 can first receive information regarding the arrangement of these visual indicators 111, 112, 113, 114, 115 for this particular landing surface 106. In this way, when the deployed UAV 101 is looking to return to this particular landing surface 106, it would scan the area and look for these visual indicators 111, 112, 113, 114, 115. Because the deployed UAV 101 has information about the arrangement of these visual indicators 111, 112, 113, 114, 115, the deployed UAV 101 can determine, for example, where the left/right/front side and/or center of the landing platform 100 is. In another embodiment, the deployed UAV 101 can scan the visual indicators 111, 112, 113, 114, 115 from the air and determine whether the landing surface 106 is level and/or suitable for landing. In this example, the deployed UAV 101 can determine the distance between itself to the various visual indicators 111, 112, 113, 114, 115 can calculate the relative levelness of the landing surface 106.

In yet another embodiment shown in FIG. 3, only three visual indicators 111, 112, 113 surrounding the landing platform 100 are needed for a deployed UAV 101 to recognize where the center of the landing platform 100 is. In still yet another embodiment, there can be only one visual indicator 115 located in the center of the landing platform 106 for a deployed UAV 101 to recognize where the center of a landing surface 106 is.

In yet another embodiment, at least one these visual indicators 111, 112, 113, 114, 115 can give off intermittent lights. In yet another embodiment, these visual indicators 111, 112, 113, 114, 115 can give off intermittent lights each having a frequency different from another and they may or may not have the same color lights. In other words, one novel method disclosed herein is for a deployed UAV 101 to recognize the orientation of the landing surface 106 by recognizing the visual indicators that are flashing at different rates.

While having visual indicators 111, 112, 113, 114, 115 that gives off light can facilitate a deployed UAV 101 in finding the landing surface 106 at night or in extreme weather conditions, some embodiments of visual indicators 111, 112, 113, 114, 115 does not emit light. In one example, the visual indicators 111, 112, 113, 114, 115 can each be painted a distinctive color but does not give off light. In another example, the visual indicators 111, 112, 113, 114, 115 can each have a distinctive shape, such as triangle, square, circle, etc. so as to allow the deployed UAV 101 to recognize them.

Figure 9:
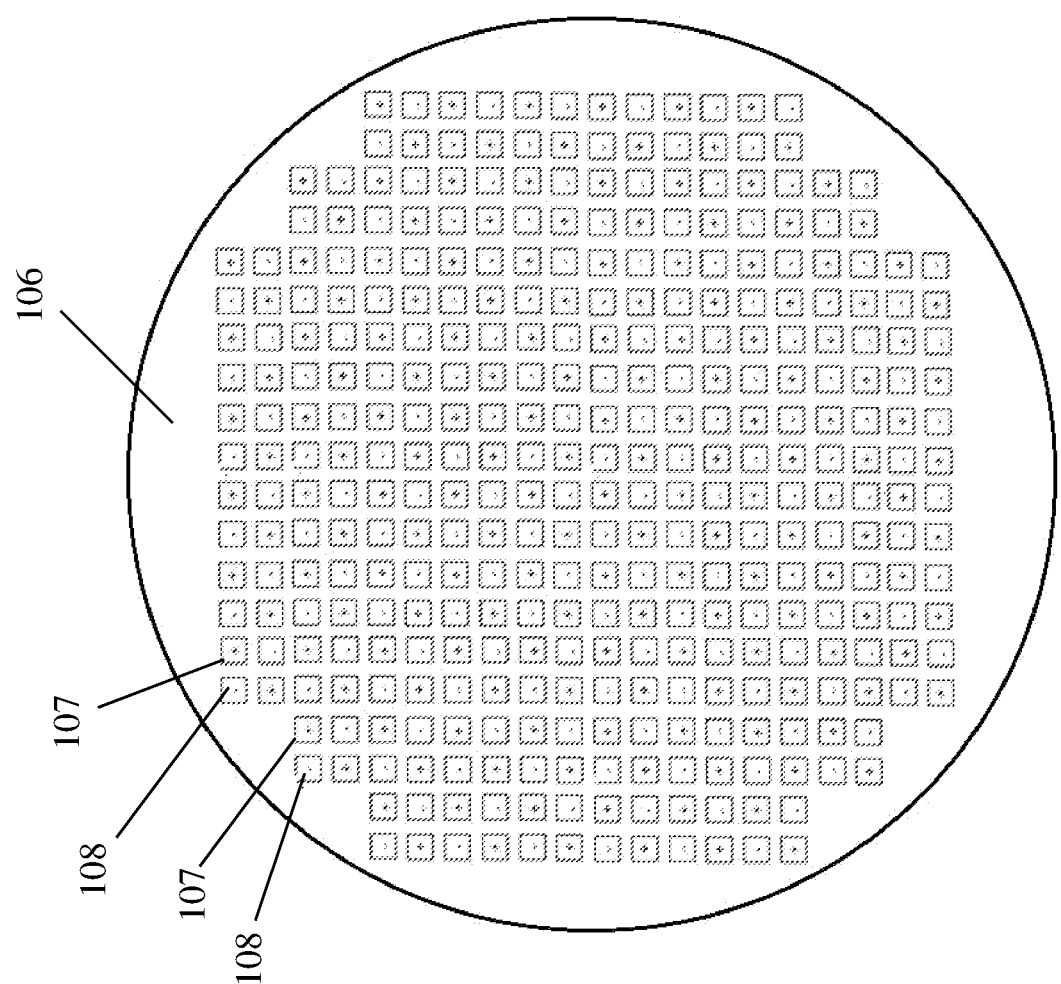
FIG. 9 illustrates a landing surface with an array of charging plates of alternating polarities, according to an aspect of the embodiment.

FIG. 9 illustrates a landing surface 106 having an array of positive polarity charging plates 107 and negative polarity charging plates 108 intermixed together. It should be appreciated that the materials contemplated herein for these charging plates 107, 108 may include various metal and/or other electrically conductive materials.

It should be understood that the size of each charging plates 107, 108 are exemplary and any other plate size, landing surface 106 coverage percentage, distance in between adjacent charging plates 107, 108 can be adopted in various embodiments of this disclosure.

Figure 10:
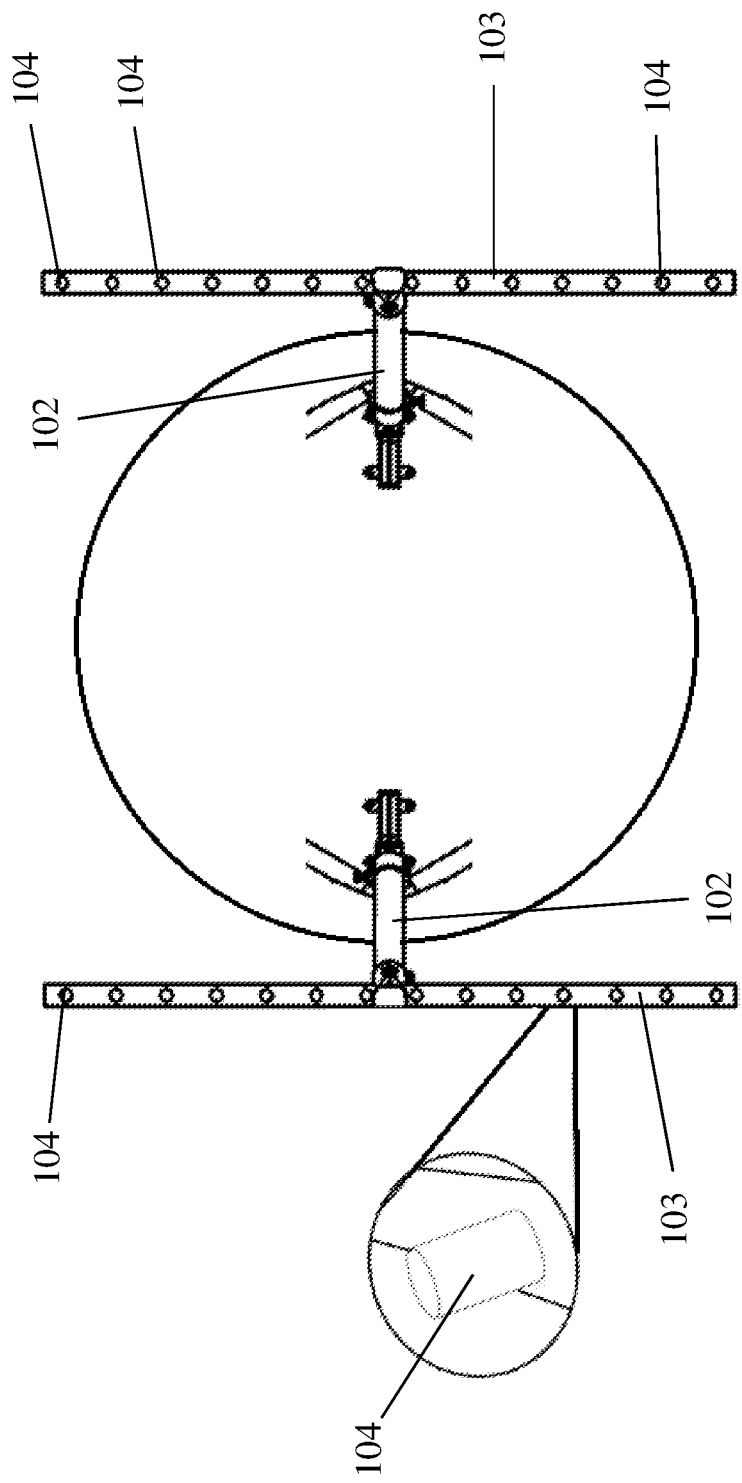
FIG. 10 is a bottom view of a skid of a contemplated UAV. The bottom side of the skid has a plurality of contacts to make electrical connection with the array of charging plates, according to one aspect of the embodiments.

To effectuate charging of a resting UAV 101, the resting UAV 101 must also have certain charging contacts available. Referring now the FIG. 10, a UAV 101 can have a pair of skids 103 as its landing gear. The bottom of the skid 103 can have a plurality of charging points 104.

Although a pair of skids 103 is disclosed in the example, the UAV 101 may adapt any type of landing gear. Also, instead of having charging points on the skids 103, the UAV 101 may have a dedicated charging bar having these like charging points on the bottom side of the bar. The bar can be designed to touch the landing surface 106 when the UAV 101 rests on the landing surface 106.

Figure 11:
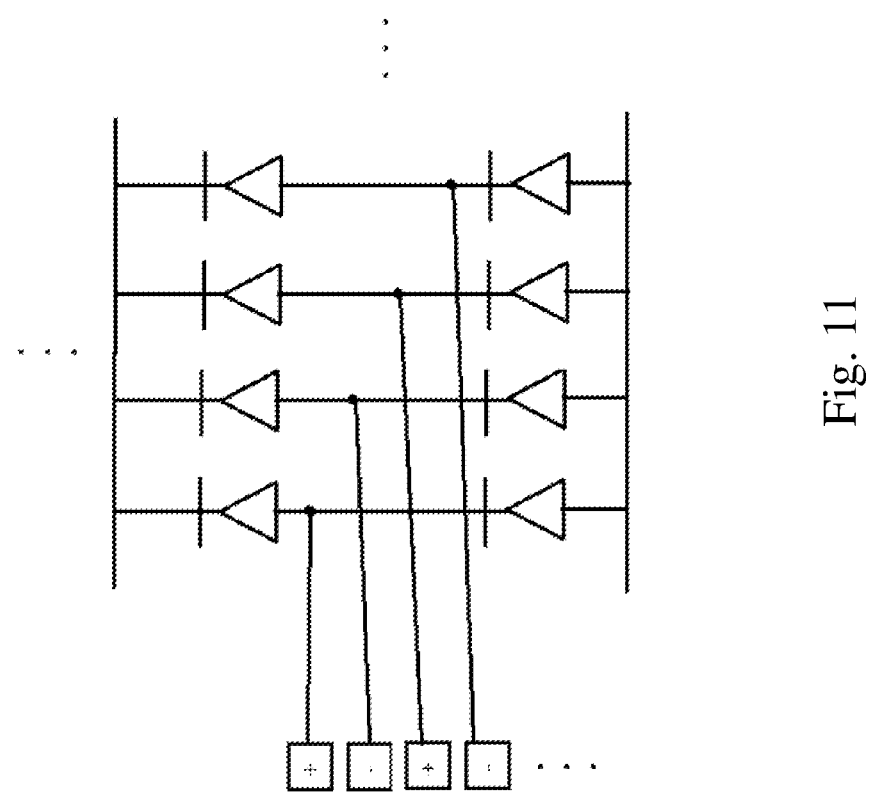
FIG. 11 is an electrical diagram illustrating how a plurality of pointy contacts make electrical connection with the array of charging plates to effectuate electrical charging of the UAV, according to one aspect of the embodiments.

Operation of the charging unit is straightforward. The UAV 101 having these charging points 104 can land on the contemplated landing surface 106 having an array of charging plates 107, 108 with alternative polarities. The UAV 101 is not required to orient itself in any particular manner to align its charging points 104 to any particular charging plates 107, 108. The UAV 101 can simply land on the landing surface 106 and the charging points 104 would make physical contact with some of the charging plates 107, 108. FIG. 11 is an electrical diagram illustrating how charging can be effectuated without deliberate alignment on the part of the UAV 101. Each charging point 104 can have a diameter smaller than the distance between any of two adjacent charging plates 107, 108. This can prevent inadvertent electrical shortening by making sure a single charging point 104 cannot physically touch two adjacent charging plates 107, 108 simultaneously.

There can be any numbers of charging points 104 so long as there are sufficient numbers of them to ensure the chances that when a UAV 101 lands on the charging plates 107, 108, at least one charging point 104 would make contact with a positive charging plate 107, and at least another charging point 104 would make contact with a negative charging plate 108.

Optionally or additionally, transmission of data between the resting UAV 101 and the landing platform 100 can be performed by the charging points 104 making physical contact with some of the charging plates 107, 108.

Figure 12:
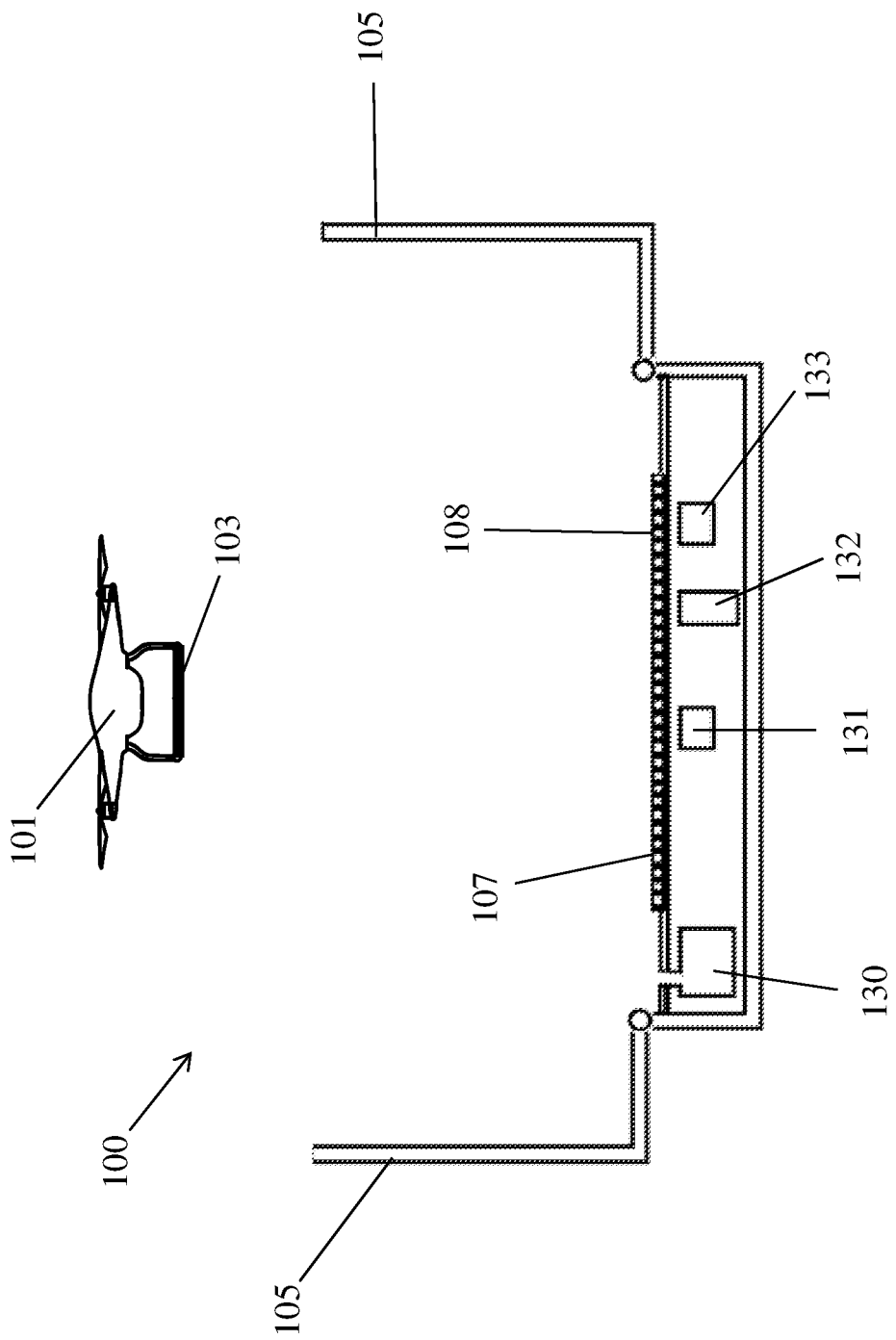
FIG. 12 illustrates a landing platform with pivoting panels in an open position, where the landing platform is on a level footing, according to one aspect of the embodiments.

Among the many different possibilities contemplated, landing platform 100 can have other optional accessories. FIG. 12 shows one embodiment of a landing platform 100 with its pivoting panels 105 pivoted open and embedded accessories.

In one aspect of the disclosure, there can be a dryer 130 located within the landing platform to supply a flow of air, or heated air to dry a resting UAV 101.

In another aspect of the disclosure, the landing platform 100 may have its own power storage 131 to support the operation of the landing platform 100, to charge a resting UAV 101, or both. There can also be an optional wireless transmitter 132 to transmit data from and/or to the resting UAV 101 via WIFI, Li-Fi, BLUETOOTH, or any other wireless protocol.

An optionally processor 133 can also be provided within the landing platform 100 to process necessary data, signals, commands.

Landing platform 100 can have a movement compensating mechanism to self-adjust/self-level the position of the either the landing platform 100 entirely, the landing surface 106, or both. When a prior art UAV attempt to lands on a boat in the raging sea, the UAV risks crashing into the boat because the waves are causing sudden and extreme vertical lifting and dropping of the boat. Even when not in extreme weather conditions, small waves may also cause the UAV to crash into the boat. Often time when a UAV crashes, some or all of its propellers can be damaged, rendering the UAV non-functional. One skilled in the art would recognize that a UAV can also risk crashing when trying to land onto a moving van when the van is traversing through uneven terrain. As the van traverse through uneven terrain, the suspension system of the van would not compensate 100% of the bumpy travel. The van would still invariable experience shaking, rattling, and/or sudden jumps/drops. Any UAV attempting to land onto the moving van would risk crashing into the van.

Figure 13:
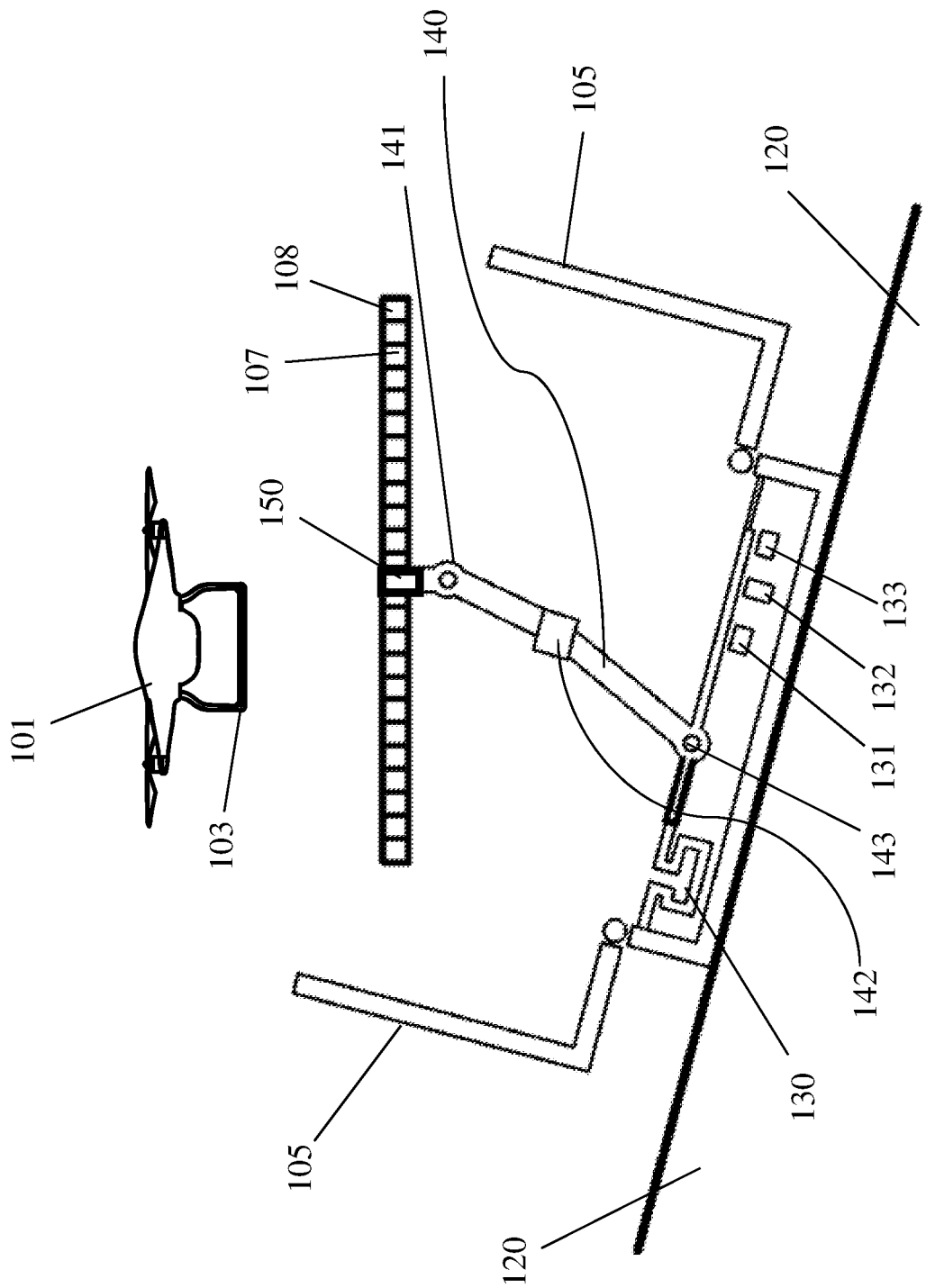
FIG. 13 illustrates a landing platform with pivoting panels in an open position, where the landing platform is not on a level footing and the movable arm causes leveling of the landing surface, according to one aspect of the embodiments.

Therefore, an important aspect of the disclosure is a novel landing platform 100 and a method of landing UAV onto a landing platform 100 where the landing platform 100 has a movement compensating mechanism. FIG. 13 shows one embodiment of the movement compensating mechanism in a form of a movable arm 140 having three joints 141, 142, 143. The movable arm 140 and the three joints 141, 142, 143 can be motorized by actuators and their movements can be controlled by the processor 133. An inertial measurement unit (IMU) can be disposed in the middle of the landing surface 106 and provide positional information to the processor 133. Joints 141 can provide necessary adjustment in a pitch of the landing surface 106. Joints 142, on the other hand, can provide necessary adjustment in a roll of the landing surface 106. Joints 143 can provide necessary adjustment in an altitude of the landing surface 106. Joints 141, 142, 143 provide three axes of movement to the movement compensating mechanism.

In other embodiments, there can be at least two axes of movement. In yet another embodiment, there can be at least three axes of movement. In still other embodiments, there can be at least four axes of movement. In still yet other embodiments, there can be at least five axes of movement.

There can be an optional axis of movement that controls a yaw of the landing surface 106.

As shown in FIG. 13, the landing platform 100 is installed onto a moving watercraft 120 which is currently tilted. The disclosed moving arm 140 and the contemplated three joints 141, 142, 143 automatically self-adjusts in real time to ensure the landing surface 106 remains in the same level position relative to earth. In applications where the movement caused the environment is expected to be great, the moving arm 140 and the contemplated joints can be much longer so that the longer moving arm 140 can have a greater room of movement.

Figure 14:
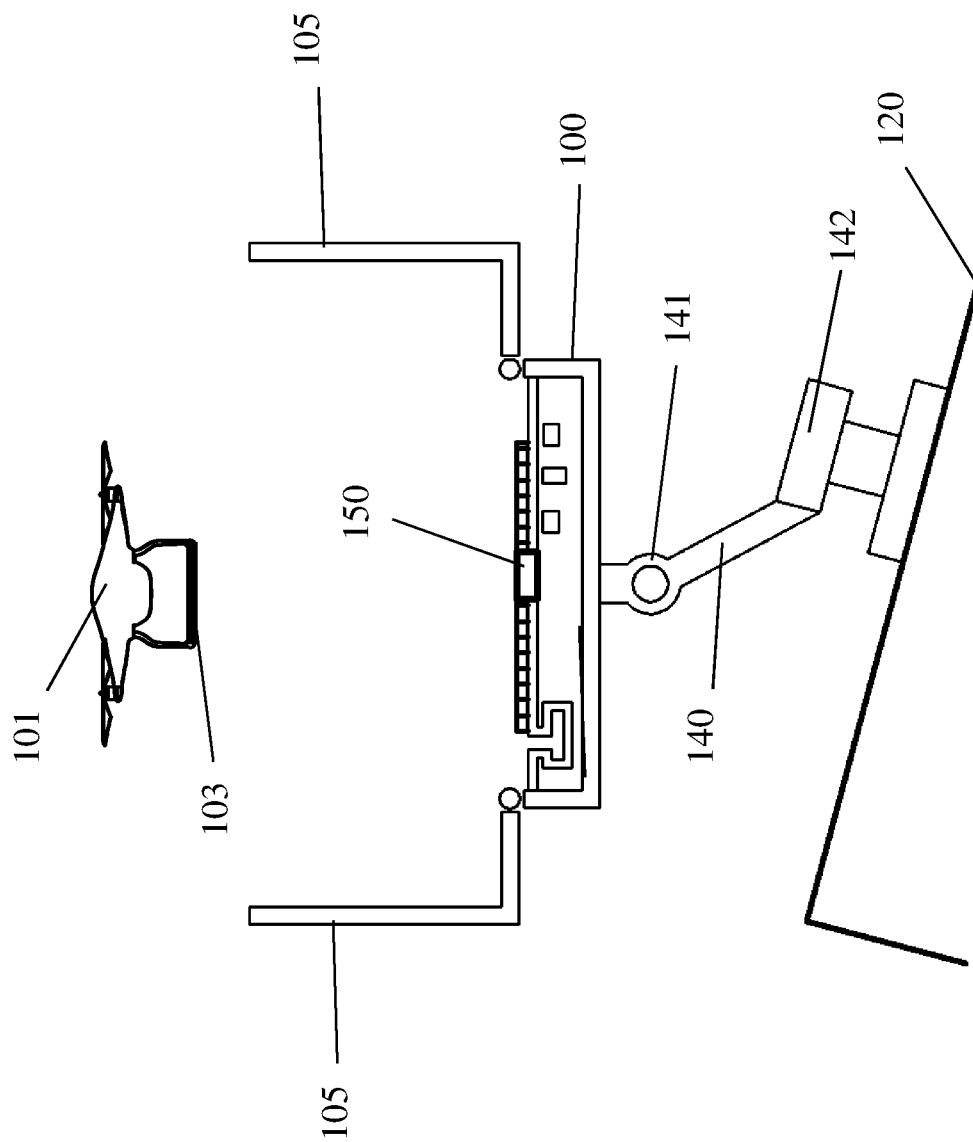
FIG. 14 illustrates a landing platform with pivoting panels in an open position, where the landing platform is not on a level footing and the movable arm causes leveling of the entire landing platform, according to one aspect of the embodiments.

Similarly in FIG. 14, the landing platform 100 is installed onto a moving watercraft 120 which is currently tilted. The moving arm 140 and the contemplated three joints 141, 142, 143 automatically self-adjusts in real time to ensure the entire landing platform 100 remains in the same level position relative to earth.

Figure 15:
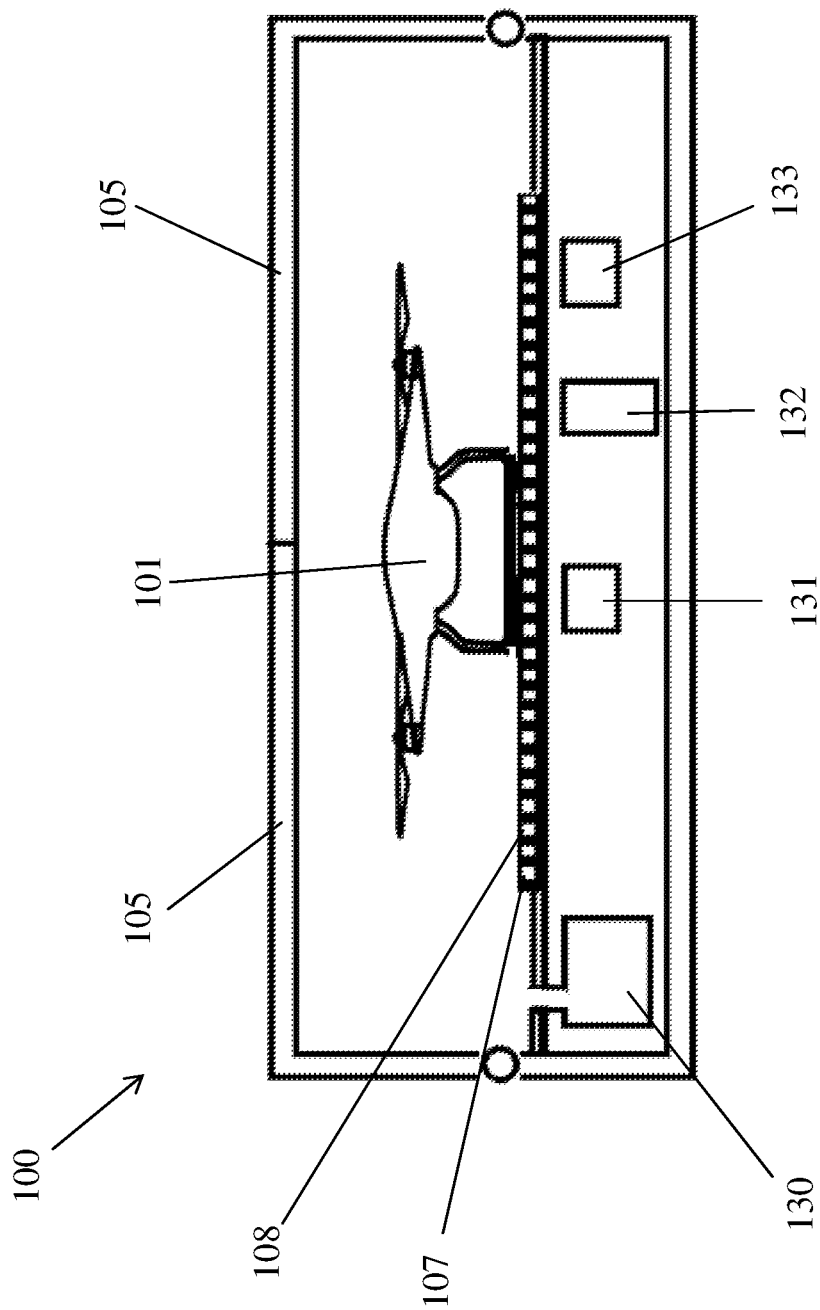
FIG. 15 illustrates a landing platform with a resting UAV stored therein, according to one aspect of the embodiments.

FIG. 15 illustrates a resting UAV 101 parked on the landing surface 106 undergoing charging.

Novel applications of the disclosed embodiments include methods of storing, deploying, transporting, and maintaining an unmanned aerial vehicle (UAV). More specifically, deploying and receiving a UAV where the landing platform 100 is in constant movement.

This disclosure also provides a novel method of using UAV to perform long-term missions with minimum human maintenance at remote locations. The disclosed landing platform 100 can allow longer operation time for each UAV because each UAV can accurately find its landing platform 100, safely land on it, download data to it, and charge electricity from it autonomously.

Further contemplated novel method includes a mobile base station for a UAV to be launched from, return to, and performed maintenance in. The mobile base station can include any aircraft, watercraft, land vehicle, and floating station having the disclosed landing platform 100 installed thereon.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a landing platform have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A landing platform for an unmanned aerial vehicle (UAV) to be installed onto an object, the landing platform comprising:
   a base having a landing surface;
   a movable cover coupled to the base to enclose an interior space of the landing platform;
   at least three visual indicators coupled to the base;
   a plurality of charging contacts disposed on said landing surface to make direct contact with a charging contact of said UAV when said UAV rests on said landing surface;
   a movement compensating mechanism coupled to the landing surface to compensate a movement of the landing surface relative to the object, wherein the compensating mechanism provides a freedom of tilting movement along at least one axis relative to the object so as to keep the land surface level irrespective of the object; and
   a heater coupled to the base to supply heat into said interior space.

2. The landing platform as recited in claim 1 wherein each of the at least three visual indicators has an attribute that is different from one another; and wherein the three visual indicators includes at least one selected from a group consisting of a colored light, colored marker, distinctively shaped marker.

3. The landing platform as recited in claim 1, wherein the plurality of charging contacts includes an array of charging plates, wherein the charging plates are arranged in alternating polarities.

4. The landing platform as recited in claim 1 wherein the movement compensating mechanism has at least 3 axes of tilting movement.

5. The landing platform as recited in claim 4, wherein the movement compensating mechanism has at least 3 axes of movement.

6. The landing platform as recited in claim 1, wherein the movable cover includes a plurality of pivoting panels, and the landing platform further comprises a wireless transmitter to automatically transfer a data from said UAV.

7. A method of storing, deploying, and maintaining an unmanned aerial vehicle (UAV), said method comprising:
   providing a storage container including:
      a base having a landing surface; and
      a movable cover coupled to said base capable of enclosing an interior storage space to store a UAV;
   placing said UAV within the interior storage space on top of the landing surface;
   charging said UAV by providing a plurality of charging contacts on the landing surface and said plurality of charging contacts make physical connection with a part of the UAV to charge the UAV; and
   drying the UAV with a heater coupled to the storage container.

8. The method as recited in claim 7 further comprising arranging the plurality of charging contacts in an array of charging plates of alternating charges.

9. The method as recited in claim 7 further comprising detachably coupling the storage container onto a movable object, said movable object is one selected from a group consisting of a land vehicle, a water craft, an aerial vehicle, a floating station, and a gear attached to an animal.

10. The method as recited in claim 9 further comprising providing a movement compensating mechanism to move the landing surface such that the landing surface remains stationary relative to earth regardless of a movement of the moving object.

11. The method as recited in claim 10, wherein the movement compensating mechanism includes an inertial measurement unit and a robotic arm.

12. The method as recited in claim 7 further comprising:
allowing a UAV to recognize at least three visual indicators each has an attribute that is different from others, wherein the three visual indicators includes at least one selected from a group consisting of a colored light, a colored marker, and a distinctively shaped marker; and
automatically and wirelessly download a data from the UAV.

13. An aerial vehicle charging system, the system comprising:
a first plurality of charging contacts disposed on a bottom surface of a landing gear of the aerial vehicle;
a second plurality of charging contacts disposed on a landing surface configured for the aerial vehicle to rest on; and
a dryer coupled to the landing surface configured to dry the aerial vehicle;
wherein the second plurality of charging contacts supply electricity to the aerial vehicle via the first plurality of charging contacts.

14. The aerial vehicle charging system as recited in claim 13, wherein the second plurality of charging contacts include a group of positive contacts intermixed with a group of negative contacts.

15. The aerial vehicle charging system as recited in claim 13 further comprising a movable cover coupled to the landing surface capable to enclosing the aerial vehicle in an interior space.

16. The aerial vehicle charging system as recited in claim 13 further comprising a movement compensative arm with at least 3 axes configured to automatically move the landing platform to ensure the landing platform is substantially stationary relative to earth.

17. The aerial vehicle charging system as recited in claim 13 further comprising at least three light sources disposed about the landing surface, said at least three light sources each has a distinct color.

* * * * *